US008569991B2

(12) United States Patent
Manaka et al.

(10) Patent No.: US 8,569,991 B2

(45) Date of Patent: Oct. 29, 2013

(54) STEPPING MOTOR CONTROL CIRCUIT AND ANALOGUE ELECTRONIC WATCH

(75) Inventors: Saburo Manaka, Chiba (JP); Akira Takakura, Chiba (JP); Kenji Ogasawara, Chiba (JP); Kazumi Sakumoto, Chiba (JP); Shotaro Kamiyama, Chiba (JP); Keishi Honmura, Chiba (JP); Kosuke Yamamoto, Chiba (JP); Hiroshi Shimizu, Chiba (JP)

(73) Assignee: Seiko Instruments Inc. (JP)

( * ) Notice: Subject to any disclaimer, the term of this patent is extended or adjusted under 35 U.S.C. 154(b) by 496 days.

(21) Appl. No.: 12/928,271

(22) Filed: Dec. 7, 2010

(65) Prior Publication Data

US 2011/0141857 A1 Jun. 16, 2011

(30) Foreign Application Priority Data

Dec. 16, 2009 (JP) ................................ 2009-285338
Sep. 29, 2010 (JP) ................................ 2010-219827

(51) Int. Cl.
*H02P 8/00* (2006.01)

(52) U.S. Cl.
USPC .......................................................... 318/696

(58) Field of Classification Search
None
See application file for complete search history.

(56) References Cited

U.S. PATENT DOCUMENTS

| | | | | |
|---|---|---|---|---|
| 4,441,826 | A * | 4/1984 | Morokawa et al. | 368/204 |
| 5,933,392 | A * | 8/1999 | Sato et al. | 368/157 |
| 6,061,304 | A * | 5/2000 | Nagata et al. | 368/66 |
| 2005/0243657 | A1* | 11/2005 | Nagata | 368/204 |
| 2007/0278976 | A1* | 12/2007 | Kawaguchi et al. | 318/116 |
| 2008/0089183 | A1 | 4/2008 | Manaka et al. | 368/202 |
| 2009/0135674 | A1* | 5/2009 | Matsuzaki | 368/14 |
| 2009/0316535 | A1* | 12/2009 | Ogasawara et al. | 368/80 |

OTHER PUBLICATIONS

Abstract, publication No. 61015385, publication date Apr. 23, 1986.

* cited by examiner

*Primary Examiner* — Lincoln Donovan
*Assistant Examiner* — Zoheb Imtiaz
(74) *Attorney, Agent, or Firm* — Adams & Wilks

(57) ABSTRACT

A stepping motor control circuit includes a rotation detection circuit that detects an induced signal and detects whether or not the induced signal exceeds a predetermined reference threshold voltage in a detection segment having a plurality of detection areas, and a control unit that determines the state of rotation of a stepping motor on the basis of a pattern indicating whether or not the induced signals exceed the reference threshold voltage and, on the basis of the result of detection, controls the driving of the stepping motor with anyone of a plurality of main drive pulses different from each other in energy or a correction drive pulse having larger energy than the main drive pulse. An ineffective area is provided between at least the two detection areas, and the control unit determines the state of rotation of the stepping motor without considering the induced signal.

20 Claims, 8 Drawing Sheets

FIG. 4

| DETECTION OF ROTATION | | | | | PULSE CONTROL | | |
|---|---|---|---|---|---|---|---|
| T1 | TS | T2 | T3 | DETERMINATION | DETERMINATION | P1 | P2 |
| 0 | – | 1 | 1/0 | HIGH ENERGY, NORMAL DRIVE, ROTATION WITH RESERVE | DOWNGRADE | -1 RANK | NO |
| 1 | – | 1 | 1/0 | MODERATE-LOAD-INCREASED DRIVING, ROTATION WITH NO RESERVE | MAINTENANCE | ±0 RANK | NO |
| 1/0 | – | 0 | 1 | LARGE-LOAD-INCREASED DRIVING, ROTATION WITH LEAST ENERGY | UPGRADE | +1 RANK | NO |
| 1/0 | – | 0 | 0 | EXTREMELY-LARGE-LOAD-INCREASED DRIVING, NON-ROTATION | P2 + UPGRADE | +1 RANK | YES |

FIG. 10

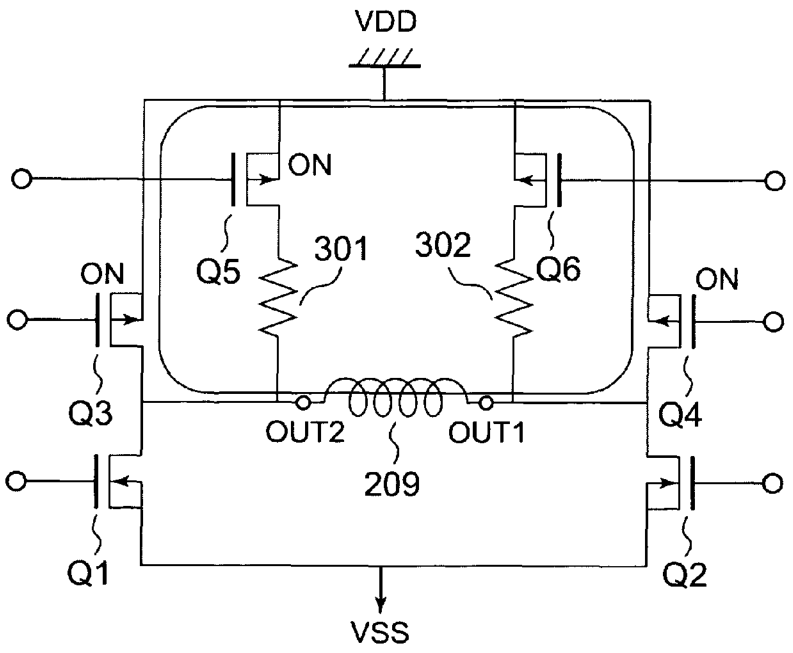

FIG. 11

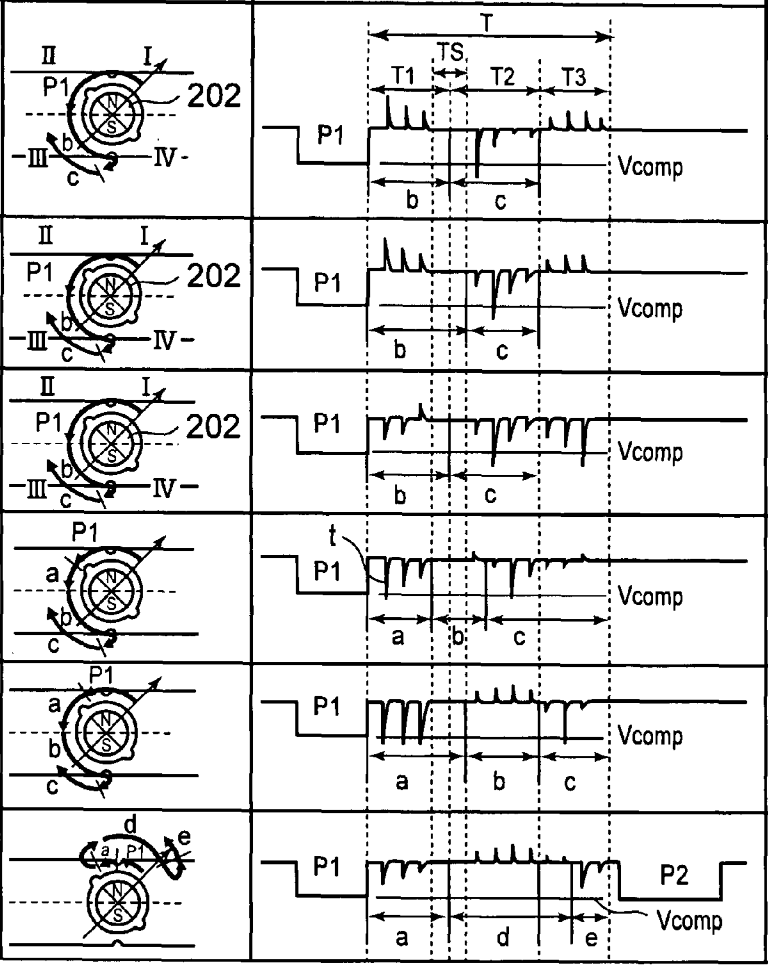

| STATE | ROTATION BEHAVIOUR | VRs OUTPUT TIMING | T1 | TS | T2 | T3 | PULSE CONTROL |
|---|---|---|---|---|---|---|---|
| HIGH-ENERGY DRIVING, ROTATION WITH RESERVE | | | 0 | – | 1 | 0 | DOWNGRADE |
| NORMAL DRIVING, ROTATION WITH RESERVE | | | 0 | – | 1 | 0 | DOWNGRADE |
| SMALL-LOAD-INCREASED DRIVING, ROTATION WITH LESS RESERVE | | | 0 | – | 1 | 1 | DOWNGRADE |
| MODERATE-LOAD-INCREASED DRIVING, ROTATION WITH NO RESERVE | | | 1 | – | 1 | 0/1 | MAINTENANCE |
| LARGE-LOAD-INCREASED DRIVING, ROTATION WITH LEAST ENERGY | | | 0/1 | – | 0 | 1 | UPGRADE |
| EXTREMELY-LARGE-LOAD-INCREASED DRIVING, NON-ROTATION | | | 0/1 | – | 0 | 0 | UPGRADE + P2 |

STEPPING MOTOR CONTROL CIRCUIT AND ANALOGUE ELECTRONIC WATCH

BACKGROUND OF THE INVENTION

1. Field of the Invention

The present invention relates to a stepping motor control unit and an analogue electronic watch using the stepping motor control circuit.

2. Description of the Related Art

In the related art, a stepping motor including a stator having a rotor storage hole and a positioning portion for determining a stop position of a rotor, the rotor disposed in the rotor storage hole, and a coil, and being configured to rotate the rotor by causing the stator to generate a magnetic flux by supplying alternating signals to the coil and stop the same at a position corresponding to the positioning portion is used in an analogue electronic watch, for example.

A method employed as a method of controlling the stepping motor is a correction drive system configured to detect whether or not the stepping motor is rotated by detecting an induced signal VRs generated in the stepping motor when the stepping motor is driven with a main drive pulse P1 and, according to the result of detection of whether or not the stepping motor is rotated, change the pulse width of the main drive pulse P1 and drive the stepping motor with the changed main drive pulse P1 or forcedly rotate the stepping motor with a correction drive pulse P2 having a pulse width larger than that of the main drive pulse P1 (for example, JP-B-61-15385).

WO2005/119377 discloses a unit for comparatively discriminating the detected time and the reference time in addition to the detection of the induced signal when detecting the rotation of the stepping motor. If the detected signal is lower than a predetermined reference threshold voltage Vcomp after having rotated the stepping motor with a main drive pulse P11, the corrected drive pulse P2 is supplied, and the subsequent main drive pulse P1 is changed to a main drive pulse P12 having a larger energy than the main drive pulse P11 for driving the stepping motor (upgrade). If the detected time of the rotation with the main drive pulse P12 is earlier than the reference time, the main drive pulse P12 is changed to the main drive pulse P11 (downgrade). In this manner, the pulse is controlled to rotate the stepping motor with the main drive pulse P1 according to the load by determining the state of rotation of the stepping motor when being driven with the main drive pulse, so that the current consumption is reduced.

However, if an attempt is made to determine the state of rotation of the stepping motor only on the basis of whether or not the time of day when the induced signal VRs is generated is earlier than the reference time, determination of the amount of the excess or the shortage of the energy of the main drive pulse with respect to the load is difficult. Therefore, further adequate pulse control is not achieved, and hence an unstable rotation and a limited reduction of power consumption are resulted.

SUMMARY OF THE INVENTION

It is an aspect of the invention to achieve a further stable rotation of a stepping motor by determining the state of rotation more accurately and hence controlling a pulse adequately and to achieve a reduction of power consumption.

According to the invention, there is provided a stepping motor control circuit including: a rotation detection unit configured to detect an induced signal generated by the rotation of a rotor of a stepping motor and detect whether or not the induced signal exceeds a predetermined reference threshold voltage in a detection segment having a plurality of detection areas; and a control unit configured to determine the state of rotation of the stepping motor on the basis of the pattern indicating whether or not the induced signals detected by the rotation detection unit in the plurality of detection areas exceed the reference threshold voltage and, on the basis of the result of detection, control the driving of the stepping motor with any one of a plurality of main drive pulses different from each other in energy or a correction drive pulse having larger energy than the main drive pulse, wherein an ineffective area is provided between at least the two detection areas, and the control unit determines the state of rotation of the stepping motor without considering the induced signal generated in the ineffective area.

According to the invention, there is provided an analogue electronic watch having a stepping motor configured to rotate time-of-day hands, and a stepping motor control circuit configured to control the stepping motor, in which any one of the above-described stepping motor control circuits is as the stepping motor control circuit.

According to the motor control circuit in the invention, the state of rotation is determined further accurately and hence an adequate pulse control is achieved. Consequently, further stable rotation and reduction of power consumption are achieved.

According to the analogue electronic watch in the invention, the state of rotation is determined further accurately and hence an adequate pulse control is achieved. Consequently, further accurate driving of the time-of-day hands and reduction of power consumption are achieved.

BRIEF DESCRIPTION OF THE DRAWINGS

FIG. 4 is a determination chart for explaining the action of the stepping motor control circuit and the analogue electronic watch according to the embodiment of the invention;

FIG. 10 is a partly detailed circuit diagram of the drive pulse selection circuit and the rotation detection circuit used in the respective embodiments of the invention; and FIG. 11 is a timing chart for explaining the action of the stepping motor control circuit and the analogue electronic watch according to a still further embodiment of the invention.

BEST MODE FOR CARRYING OUT THE INVENTION

Figure 1:
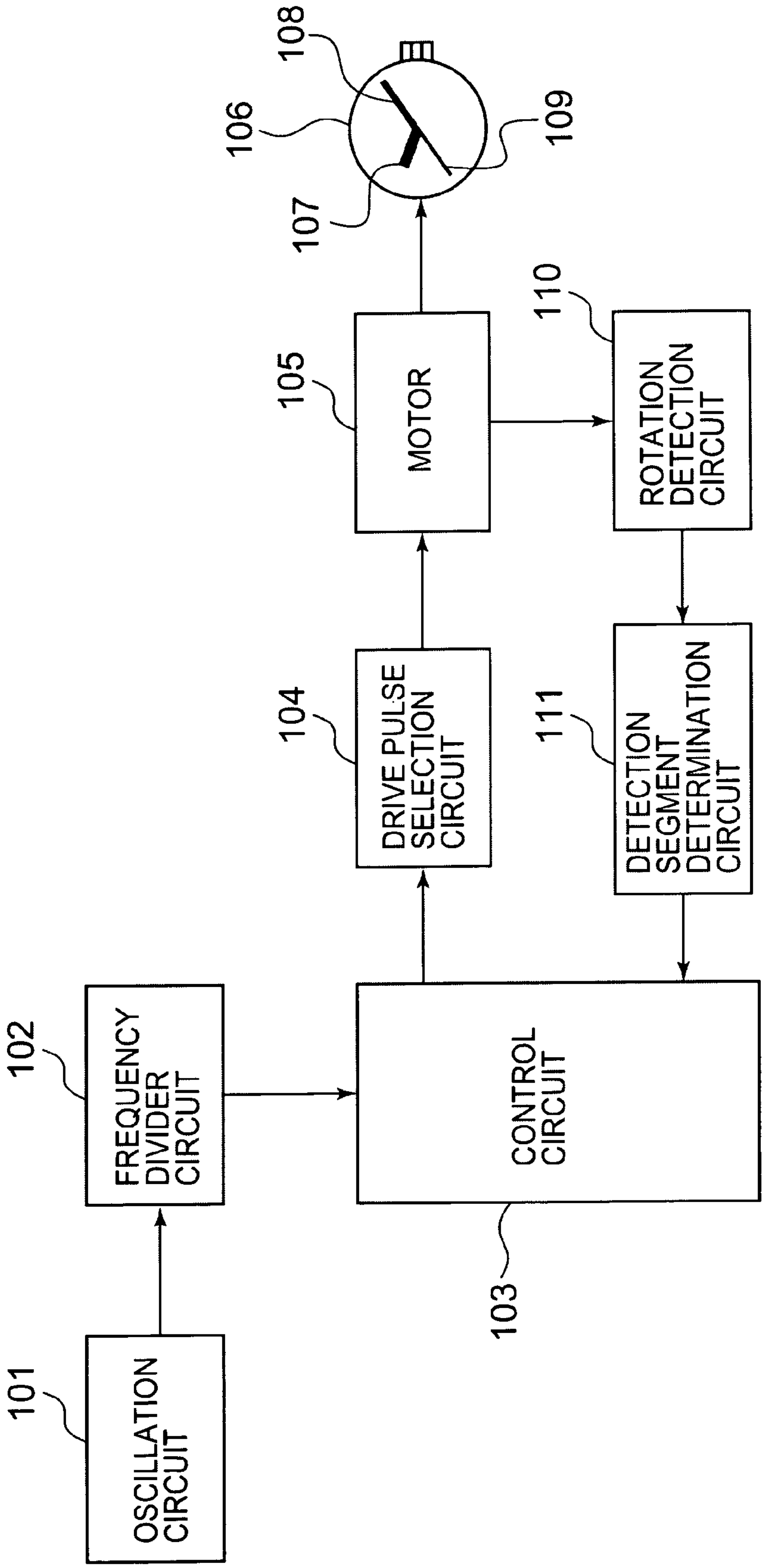
FIG. 1 is a block diagram showing a stepping motor control circuit and an analogue electronic watch according to an embodiment of the invention.

FIG. 1 is a block diagram of an analogue electronic watch using a motor control circuit according to an embodiment of the invention, and shows an example of an analogue electronic wrist watch.

In FIG. 1, the analogue electronic watch includes an oscillation circuit 101 configured to generate signals of a predetermined frequency, a frequency divider circuit 102 configured to divide the frequency of the signals generated by the oscillation circuit 101 and generate a clock signal which serves as a reference when counting the time, a control circuit 103 configured to perform control of respective electronic circuit elements which constitute the electronic watch and control of drive pulse change, a drive pulse selection circuit 104 configured to select and output a drive pulse for rotating a motor on the basis of a control signal from the control circuit 103, a stepping motor 105 configured to be rotated by the drive pulse from the drive pulse selection circuit 104, and an analogue display unit 106 configured to be rotated by the stepping motor 105 includes a time-of-day hands indicating the time of day (three types; namely, a hour hand 107, a minute hand 108, and a second hand 109 in an example shown in FIG. 1).

The analogue electronic watch also includes a rotation detection circuit 110 configured to detect induced signals VRs which are generated by the rotation of the rotor of the stepping motor 105 and exceed a predetermined reference threshold voltage in a predetermined detection segment T, and a detection segment determination circuit 111 configured to compare a time point and a segment where the rotation detection circuit 110 detects the induced signal VRs exceeding a reference threshold voltage Vcomp and determine the segment where the induced signal VRs is detected. Although the detailed description will be given later, the detection segment T is divided into a plurality of segments (three in this embodiment). The each segment includes a detected area for detecting whether or not the stepping motor 105 is rotated. An ineffective area is provided between at least two adjacent detection areas.

The rotation detection circuit 110 has a configuration in which the induced signal VRs is detected using the same principle as the rotation detection circuit described in JP-B-61-15385, and the reference threshold voltage Vcomp is set as follows. When the speed of the rotation is high as in the case where the stepping motor 105 rotates, the induced signal VRs exceeding the predetermined reference threshold voltage Vcomp is generated. When the speed of rotation is low as in the case where the motor 105 does not rotate, the induced signal VRs does not exceed the reference threshold voltage Vcomp.

The oscillation circuit 101 and the frequency divider circuit 102 constitute a signal generating unit, and the analogue display unit 106 constitutes a time-of-day display unit, and the analogue display unit 106 constitutes a time-of-day display unit. The rotation detection circuit 110 constitutes a rotation detection unit, and the control circuit 103, the drive pulse selection circuit 104, and the detection segment determination circuit 111 constitute a control unit.

Figure 2:
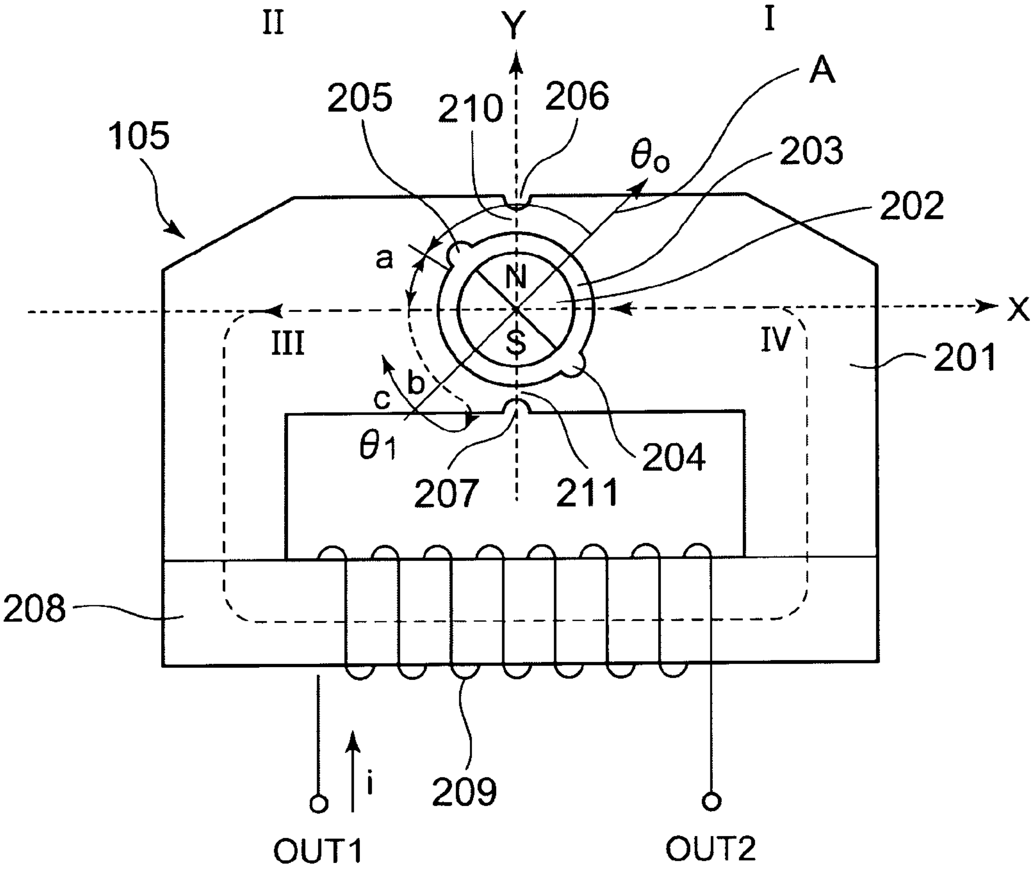
FIG. 2 is a drawing showing a configuration of a stepping motor used in the analogue electronic watch according to the embodiment of the invention.

FIG. 2 is a configuration drawing of the stepping motor 105 which is used in the embodiment of the invention, and shows an example of a stepping motor for a watch which is generally used in the analogue electronic watch.

In FIG. 2, the stepping motor 105 includes a stator 201 having a rotor storage through hole 203, a rotor 202 disposed in the rotor storage through hole 203 so as to be capable of rotating therein, a magnetic core 208 joined to the stator 201, and a coil 209 wound around the magnetic core 208. When the stepping motor 105 is used in the analogue electronic watch, the stator 201 and the magnetic core 208 are fixed to a base panel (not shown) with screws (not shown) and are joined to each other. The coil 209 has a first terminal OUT1 and a second terminal OUT2.

The rotor 202 is magnetized in two polarities (S-polar and N-polar). A plurality of (two in this embodiment) notched portions (outer notches) 206 and 207 are provided on outer end portions of the stator 201 formed of a magnetic material at positions opposing to each other with the intermediary of the rotor storage through hole 203. Provided between the respective outer notches 206 and 207 and the rotor storage through hole 203 are saturable portions 210 and 211.

The saturable portions 210 and 211 are configured not to be magnetically saturated by a magnetic flux of the rotor 202 and to be magnetically saturated when the coil 209 is excited so that the magnetic resistance is increased. The rotor storage through hole 203 is formed into a circular hole shape having a plurality of (two in this embodiment) semicircular notched portions (inner notches) 204 and 205 integrally formed at opposed portions of the through hole having a circular contour.

The notched portions 204 and 205 constitute positioning portions for fixing the stop position of the rotor 202. In a state in which the coil 209 is not excited, the rotor 202 is stably stopped at a position corresponding to the above-described positioning portions, in other words, at a position (position at an angle of $\theta 0$) where the direction of an axis of magnetic pole A of the rotor 202 extends orthogonally to a segment connecting the notched portions 204 and 205 as shown in FIG. 2. An XY coordinate space extending around an axis of rotation (center of rotation) of the rotor 202 as a center is divided into four quadrants (first to fourth quadrants I to IV).

When the drive pulse selection circuit 104 supplies a rectangular drive pulse to between the terminals OUT1 and OUT2 of the coil 209 (for example, the first terminal OUT1 side is the positive pole and the second terminal OUT2 side is the negative pole), and allows a current i to flow in the direction indicated by an arrow in FIG. 2, a magnetic flux in the direction of an arrow of a broken line is generated in the stator 201. Accordingly, the saturable portions 210 and 211 are saturated and the magnetic resistance is increased, and then the rotor 202 rotates in a direction indicated by an arrow in FIG. 2 by 180° by a mutual action between a magnetic pole generated in the stator 201 and a magnetic pole of the rotor 202, and the axis of magnetic pole A stops stably at an angular position $\theta 1$. The direction of rotation (counterclockwise rotation in FIG. 2) for causing the stepping motor 105 to rotate and putting the same into a normal action (the movement of the time-of-day hands because the watch in this embodiment is an analogue electronic watch) is defined to be a normal direction and the reverse direction (clockwise direction) is defined to be a reverse direction.

Subsequently, when the drive pulse selection circuit 104 supplies square-wave drive pulses to the terminals OUT1 and OUT2 of the coil 209 (the first terminal OUT1 side is the negative pole and the second terminal OUT2 side is the positive pole, so that the polarity is inverted from the driving described above), and allows a current to flow in the direction opposite from that indicated by an arrow in FIG. 2, a magnetic flux is generated in the stator 201 in the opposite direction from that indicated by an arrow of a broken line. Accordingly, the saturable portions 210 and 211 are saturated first, and then the rotor 202 rotates in the same direction (normal direction) as that described above by 180° by the mutual action between the magnetic pole generated in the stator 201 and the magnetic pole of the rotor 202, and the axis of magnetic pole A stops stably at a predetermined angular position θ0.

In this manner, by supplying the signals having different polarities (alternating signals) to the coil 209 from then onward, the action is repeatedly performed, so that the rotor 202 is rotated continuously in the direction indicated by an arrow by 180° each. In this embodiment, a plurality of main drive pulses P10 to P1*m* and a correction drive pulse P2 having energies different from each other are used as the drive pulses as described later.

Figure 3:
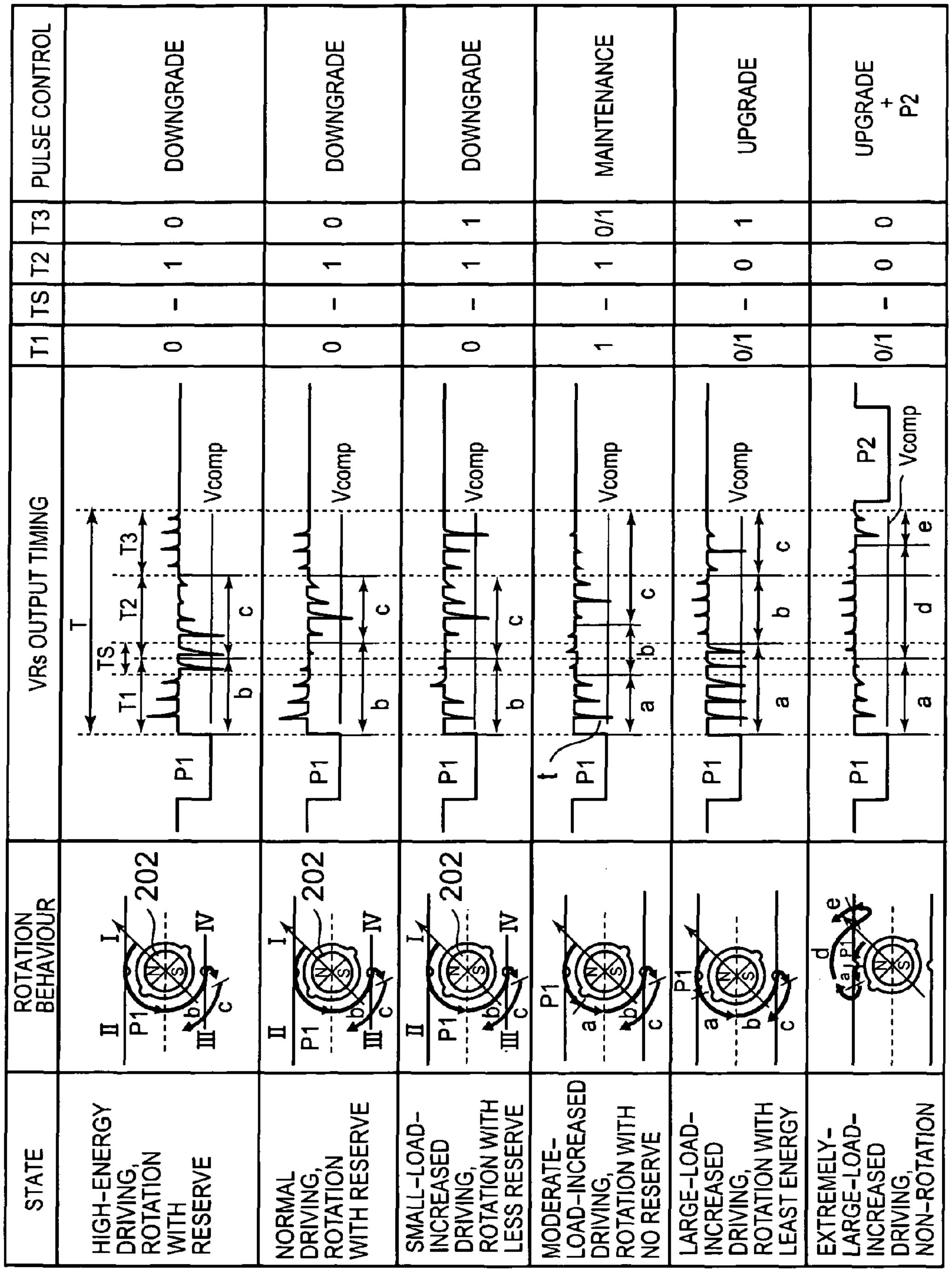
FIG. 3 is a timing chart for explaining the action of the stepping motor control circuit and the analogue electronic watch according to the embodiment of the invention.

FIG. 3 is a timing chart showing a case where the stepping motor 105 is driven with a main drive pulse P1 in this embodiment, in which the states of rotation of the stepping motor on the basis of the relationship between the energy of the main drive pulse P1 and the magnitude of the load, the rotary behaviors showing the rotational positions of the rotor 202, the timings when the induced signal VRs is generated, patterns showing the state of rotation including the reserve driving capacity and pulse control actions such as the downgrade are also shown.

In FIG. 3, reference sign P1 designates the main drive pulse P1 and also a segment in which the rotor 202 is rotated with the main drive pulse P1. Reference signs a toe designate areas showing the rotational positions of the rotor 202 due to free vibrations after the stop of drive with the main drive pulse P1.

A predetermined time immediately after the drive with the main drive pulse P1 is designated as a first segment T1, a predetermined time after the first segment T1 is designated as a second segment T2, and a predetermined time after the second segment T2 is designated as a third segment T3. In this manner, the entire detection segment T starting from a timing immediately after the drive with the main drive pulse P1 is divided into a plurality of segments (in this embodiment, three segments T1 to T3). A ineffective area Ts is provided so as to extend across the first segment T1 and the second segment T2. The ineffective area Ts is an area which is not used for determination of the state of rotation of the stepping motor 105. The respective segments T1 to T3 are basically the detection areas for detecting whether or not an induced signal exceeding the reference threshold voltage Vcomp is generated. The segment T1 and the segment T2 includes the ineffective area Ts which is not used for the determination of the state of rotation of the stepping motor 105.

In other words, the control circuit 103 determines the state of rotation of the stepping motor 105 on the basis of the patterns of the segments T1 to T3 which the induced signal VRs exceeding the reference threshold voltage Vcomp, which is detected by the rotation detection circuit 110, belongs to. However, the induced signal VRs generated in the ineffective area Ts is not considered when the state of rotation of the stepping motor 105 is determined. Therefore, the detection area in the segment T1 is an area of the segment T1 excluding the ineffective area Ts therein (a predetermined area after the segment T1 in an example shown in FIG. 3). Likewise, the detection area in the segment T2 is an area of the segment T2 excluding the ineffective area Ts therein (the predetermined area in the front portion of the segment T2 in the example shown in FIG. 3), and the detection area in the segment T3 is an entire area of the segment T3.

As described above, in this embodiment, the detection segment T is divided into a continuous plurality of the segments T1 to T3 each having a detection area, and the ineffective area Ts is provided at least between the two detection areas.

The ineffective area Ts may be provided at least in a rear area of the first segment T1 provided immediately after the driving with the main drive pulse P1.

The detection segment T may be configured to be divided at least into the first segment T1 immediately after the driving with the main drive pulse P1 and the second segment T2 after the first segment T1, and the ineffective area Ts is provided so as to extend across the first segment T1 and the second segment T2.

The detection segment T may be configured to be divided at least into the first segment T1 immediately after the driving with the main drive pulse P1, the second segment T2 after the first segment T1, and the third segment T3 after the second segment T2, and the ineffective area Ts is provided so as to extend across the first segment T1 and the second segment T2.

The control circuit 103 is configured to determine the state of rotation of the stepping motor 105 on the basis of the induced signal VRs generated in the detection area without considering the induced signal VRs generated in the ineffective area Ts.

Therefore, as in this embodiment, it may be configured in such a manner that the rotation detection circuit 110 detects the induced signal VRs exceeding the reference threshold voltage Vcomp only in the detection area, the detection segment determination circuit 111 determines the segments T1 to T3 which the induced signal VRs exceeding the reference threshold voltage Vcomp that the rotation detection circuit 110 detects belongs to, and the control circuit 103 determines the state of rotation on the basis of the result that the detection segment determination circuit 111 determines.

It is also possible to configure in such a manner that the rotation detection circuit 110 detects the induced signal VRs exceeding the reference threshold voltage Vcomp in the entire area in the segments T1 to T3, the detection segment determination circuit 111 determines which segment the induced signal VRs exceeding the reference threshold voltage Vcomp belongs to by determining which segment the induced signal VRs exceeding the reference threshold voltage Vcomp belongs to, which is detected by the rotation detection circuit 110, belongs to, and the control circuit 103 determines the state of rotation on the basis of the result determined by the detection segment determination circuit 111.

Alternatively, it may be configured in such a manner that the rotation detection circuit 110 detects the induced signal VRs exceeding the reference threshold voltage Vcomp in all the segments T1 to T3, the detection segment determination circuit 111 determines which one of the segments T1 to T3 the induced signal VRs exceeding the reference threshold voltage Vcomp, which is detected by the rotation detection circuit 110, belongs to, and the control circuit 103 determines which segment the induced signal VRs belongs to by determining which segment the detection area including the induced signal VRs exceeding the reference threshold voltage Vcomp belongs to, and the control unit 103 determines the state of rotation on the basis of the result determined by the detection segment determination circuit 111.

The rotation detection circuit 110 detects the induced signal VRs generated by free vibrations of the stepping motor 105 at predetermined sampling intervals. Accordingly, what is necessary is only to avoid the induced signal VRs detected by only one sampling from being taken into consideration. Therefore, the time width of the ineffective area Ts may have any width as long as it is not smaller than the sampling intervals of the induced signal VRs.

When the XY-coordinate space where a main magnetic pole of the rotor 202 is situated by its rotation is divided into first to fourth quadrants I to IV about the rotor 202, the first to third segments T1 to T3 can be expressed as follows.

In other words, in the state of the normal driving, the first segment T1 corresponds to a segment in which the first state of rotation of the rotor 202 in the normal direction (the direction of rotation of the rotor 202) is determined in the third quadrant III of the space around the rotor 202, the second segment T2 corresponds to a segment in which the first state of normal rotation and the first state of reverse rotation of the rotor 202 is determined in the third quadrant III, and the third segment T3 corresponds to a segment in which the state of rotation after the first reverse rotation of the rotor 202 is determined in the third quadrant III.

The normal drive means the state of driving under the normal state. In this embodiment, the state in which the time-of-day hands (the hour hand 107, the minute hand 108, and the second hand 109) are driven with the predetermined main drive pulse P1 is considered to be a normal driving, which is a rotation with the main drive pulse P1 still having reserve energy for rotating the stepping motor 105 (rotation with reserve).

In the state in which the stepping motor is driven with the main drive pulse P1 with a small load increased from the state of the normal driving (small-load-increased driving), the first segment T1 corresponds to a segment in which the first state of rotation of the rotor 202 in the normal direction is determined in the third quadrant III, the second segment T2 corresponds to a segment in which the first state of rotation in the reverse direction of the rotor 202 is determined in the third quadrant III, and the third segment T3 corresponds to a segment in which the state of rotation in and after the first rotation in the reverse direction of the rotor 202 is determined in the third quadrant III. The small-load-increased driving is a rotation with the energy of the main drive pulse P1 having a rather insufficient reserve for rotating the stepping motor 105 (rotation with less reserve).

A state of driving with the main drive pulse P1 having a larger energy than the normal driving with a load of the normal driving applied thereto (high-energy driving) is a rotation with the main drive pulse P1 having reserve energy for rotating the stepping motor 105 (rotation with reserve).

A state of driving with the main drive pulse P1 with a load increased by a moderate amount from the state of the normal driving (moderate-load-increased driving) is a rotation with the main drive pulse P1 having no reserve energy for rotating the stepping motor 105 (rotation with no reserve).

A state of driving with the main drive pulse P1 with a load increased by a large amount from the state of the normal driving (large-load-increased driving) is a rotation with the main drive pulse P1 having a least reserve energy for rotating the stepping motor 105 (rotation with least energy).

A state of driving with the main drive pulse P1 with a load increased by an extremely large amount from the state of the normal driving (extremely-large-load-increased driving) is a driving with the main drive pulse P1 lacking energy for rotating the stepping motor 105, so that the stepping motor 105 cannot be driven (non-rotation).

The reference threshold voltage Vcomp is, a reference voltage for determining the voltage level of the induced signal VRs generating in the stepping motor 105. The reference threshold voltage Vcomp is set in such a manner that the induced signal VRs exceeds the reference threshold voltage Vcomp when the rotor 202 performs a certain fast action as in the case where the stepping motor 105 rotates, and the induced signal VRs does not exceed the reference threshold voltage Vcomp when the rotor 202 does not perform the certain fast action as in the case where the stepping motor 105 does not rotate.

For example, in the state of the normal driving in FIG. 3, the induced signal VRs generated in the area b is detected in the detection area in the first segment T1, the induced signal VRs generated in the area c is detected in the detection area in the second segment T2, and the induced signal VRs generated after the area c is detected in the detection area of the third segment T3.

The case where the rotation detection circuit 110 detects the induced signal VRs exceeding the reference threshold voltage Vcomp is expressed as a determination value "1", and the case where the rotation detection circuit 110 cannot detect the induced signal VRs exceeding the reference threshold voltage Vcomp is expressed as a determination value "0". In the example of the normal driving shown in FIG. 3, a pattern (0, 1, 0) is obtained as a pattern indicating the state of rotation (the determination value in the first segment T1, the determination value in the second segment T2, and the determination value in the third segment T3). Therefore, the control circuit 103 determines that it is the normal driving (rotation with reserve), and performs pulse control to downgrade the energy of the main drive pulse P1 by a rank.

In the state of the moderate-load-increased driving, the induced signal VRs generated in the area a is detected in the detection area in the first segment T1, the induced signal generated in the area b is detected in the detection area in the second segment T2, and the induced signal generated in the area c is detected in the detection area of the second segment T2 and the detection area of the third segment T3. In the example shown in FIG. 3, a pattern (1, 1, 0) is obtained. Therefore, the control circuit 103 determines that it is a rotation with no reserve, and performs the pulse control so as to maintain the energy of the main drive pulse P1 without change.

FIG. 4 is a determination chart showing all the actions in this embodiment. In FIG. 4, as described above, the case where the induced signal VRs exceeding the reference threshold voltage Vcomp is detected is expressed as the determination value "1", and the case where the induced signal VRs exceeding the reference threshold voltage Vcomp cannot be detected is expressed as the determination value "0". The expression "1/0" means that the determination values "1" and "0" are both applicable.

As shown in FIG. 4, the rotation detection circuit 110 detects the presence or absence of the induced signal VRs exceeding the reference threshold voltage Vcomp. Then, the detection segment determination circuit 111 references the determination chart in FIG. 4 stored in the control circuit 103 on the basis of a pattern of determination of the detection timing of the induced signal VRs. The control circuit 103 and the drive pulse selection circuit 104 control the rotation of the stepping motor 105 by performing the drive pulse control such as upgrade or downgrade for the main drive pulse P1, or the driving with the correction drive pulse P2, described later.

For example, in the case of a pattern (1/0, 0, 0), the control circuit 103 determines that the stepping motor 105 is not rotating (non-rotation), and controls the drive pulse selection circuit 104 so as to drive the stepping motor 105 with the correction drive pulse P2, and then controls the drive pulse selection circuit 104 so as to drive the stepping motor 105 next time with the main drive pulse P1 which is upgraded by a rank (upgrade).

In the case of a pattern (1/0, 0, 1), the control circuit 103 determines that the stepping motor 105 rotates but is in the driving state with a load increased by a large amount from the normal load (large-load-increased driving) and hence the stepping motor 105 may become a non-rotatable state when it is driven next time (rotation with least energy). Accordingly, the control circuit 103 does not perform the driving with the correction drive pulse P2, but controls the drive pulse selection circuit 104 so as to drive the stepping motor 105 with the main drive pulse P1 upgraded by a rank next time in an early stage before it becomes the non-rotatable state.

At this time, since the ineffective area Ts having a predetermined time width is provided so as to extend across the first segment T1 and the second segment T2, the induced signal VRs which is supposed to be detected in the first segment T1 is generated in retard and hence is detected in the second segment T2 in the case of the large-load-increased driving (for example, the pattern to be detected as (1, 0, 1) is detected as (1, 1, 1)), and the pulse control which is performed without changing the main drive pulse P1 even though it should be upgraded in rank is prevented.

In the case of the pattern (1, 1, 1/0), the control circuit 103 determines that the stepping motor 105 rotates, and the driving state is such that the load is increased from the normal load by a moderate degree (moderate-load-increased driving), that is, the rotation with less reserve, and controls the drive pulse selection circuit 104 so as to drive with the main drive pulse P1 without change.

In the case of a pattern (0, 1, 1/0), the control circuit 103 determines that the stepping motor 105 rotates and the driving state is the normal driving or a high-energy driving, that is, the rotation with reserve, and controls the drive pulse selection circuit 104 so as to drive the stepping motor 105 with a main drive pulse P1 degraded by a rank for the next driving.

At this time, since the ineffective area Ts having a predetermined time width is provided so as to extend across the first segment T1 and the second segment T2, the induced signal VRs which is supposed to be detected in the second segment T2 is generated earlier and hence is detected in the first segment T1 in the case of the high-energy driving (for example, the pattern to be detected as (0, 1, 0) is detected as (1, 1, 0)), and occurrence of such event that the main drive pulse P1 is maintained without being degraded and hence wastes energy is prevented. In this case, if the ineffective area Ts is provided in at least the first segment T1, an accurate determination is possible.

Figure 5:
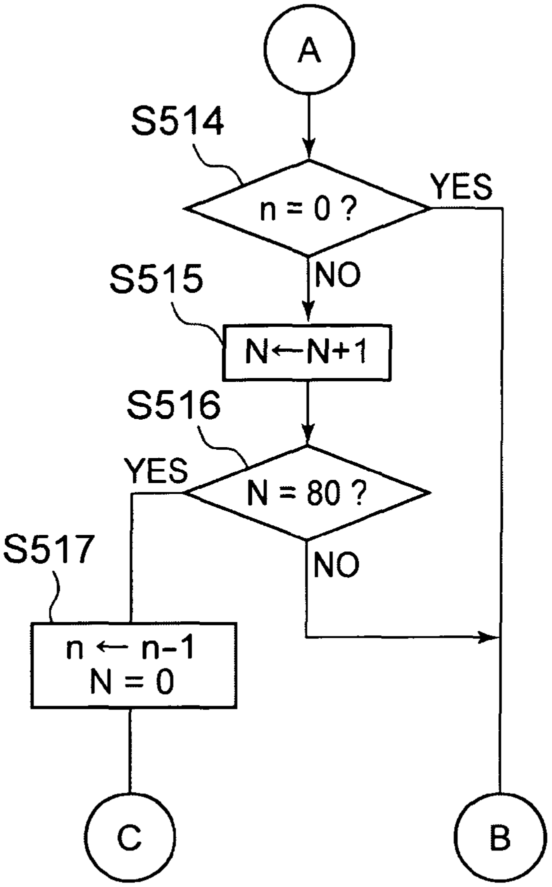
FIG. 5 is a flowchart showing the action of the stepping motor control circuit and the analogue electronic watch according to the embodiment of the invention.
Figure 7:
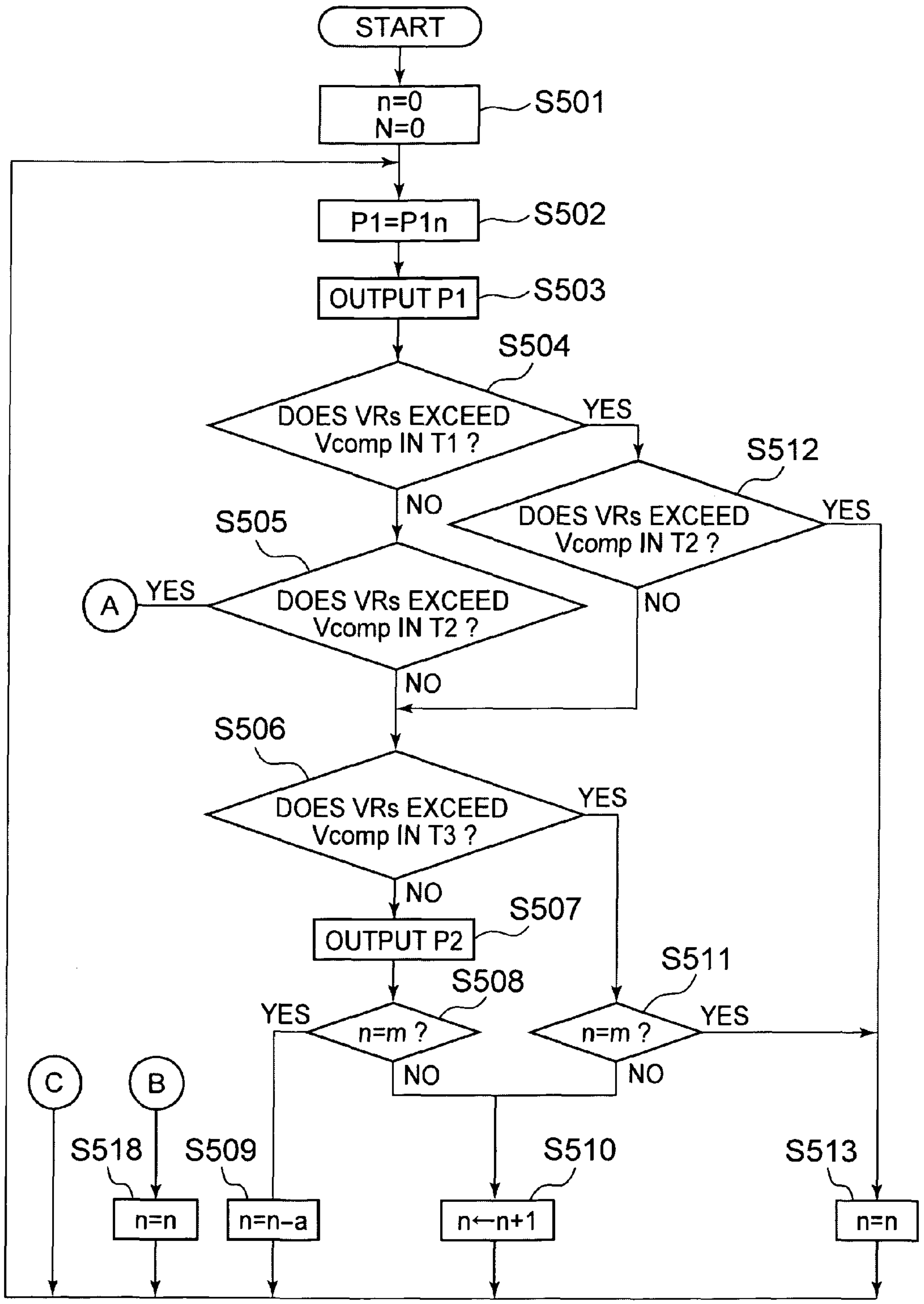
FIG. 7 is a flowchart common to the stepping motor control circuit and the analogue electronic watch according to the respective embodiments of the invention.

FIG. 5 and FIG. 7 are flowcharts showing the actions of the stepping motor control circuit and the analogue electronic watches according to the embodiment of the invention. FIG. 5 is a flowchart showing a process specific for this embodiment, and FIG. 7 is a flowchart showing a process common to other embodiments, described later.

Referring now to FIG. 1 to FIG. 5 and FIG. 7, the actions of the stepping motor control circuit and the analogue electronic watch according to the embodiment of the invention will be described in detail.

In FIG. 1, the oscillation circuit 101 generates a reference clock signal of a predetermined frequency, and the frequency divider circuit 102 divides the signal generated by the oscillation circuit 101 and generates a clock signal as a reference of time counting, and outputs the same to the control circuit 103.

The control circuit 103 counts the clock signal and performs a time counting action. Then, the control circuit 103 firstly sets a rank n of a main drive pulse P1*n* and the number of times N of continuous occurrence of the state of rotation with reserved drive capacity to zero (the driving state is a rotation with reserve or rotation with less reserve) (Step S501 in FIG. 7), and then outputs a control signal to rotate the stepping motor 105 with a main drive pulse P10 with a minimum pulse width (minimum energy rank) (Steps S502, S503).

The drive pulse selection circuit 104 rotates the stepping motor 105 with a main drive pulse P10 in response to a control signal from the control circuit 103. The stepping motor 105 is rotated with the main drive pulse P10 and then rotates the time-of-day hands 107 to 109. Accordingly, when the stepping motor 105 is normally rotated, the current time is always displayed by the time-of-day hands 107 to 109 in the analogue display unit 106.

The control circuit 103 performs determination whether or not the rotation detection circuit 110 detects the induced signal VRs of the stepping motor 105 exceeding the predetermined reference threshold voltage Vcomp, and whether or not the detection segment determination circuit 111 determines that a detected time t of the induced signal VRs falls within the segment T1 (that is, determination whether or not the induced signal VRs exceeding the reference threshold voltage Vcomp is detected within the detection area of the segment T1) (Step S504).

If the control circuit 103 determines that the induced signal VRs exceeding the reference threshold voltage Vcomp is not detected within the detection area in the first segment T1 in the process step S504 (It is a case of the pattern (0, x, x), where the determination value "x" means that the determination value may either be "1" or "0"), in the same manner, whether or not the induced signal VRs exceeding the reference threshold voltage Vcomp is detected within the detection range in the second segment T2 is determined (Step S505).

If the control circuit 103 determines that the induced signal VRs exceeding the reference threshold voltage Vcomp is not detected within the detection area in the second segment T2 in the process step S505 (It is a case of the pattern (0, 0, x)), in the same manner, whether or not the induced signal VRs exceeding the reference threshold voltage Vcomp is detected within the third segment T3 is determined (Step S506).

If the control circuit 103 determines that the induced signal VRs exceeding the reference threshold voltage Vcomp is not detected within the third segment T3 in the process step S506 (It is a case of the pattern (x, 0, 0), and the case of non-rotation in FIG. 3 and FIG. 4), the stepping motor 105 is driven with the correction drive pulse P2 (Step S507) and, if the rank n of the main drive pulse P1 is not a highest rank m, the main drive pulse P1 is upgraded by a rank to a main drive pulse P1 (n+1). Then, the procedure goes back to the process step S502, and the main drive pulse P1 (n+1) is used for the next driving (Steps S508, S510).

If the rank n of the main drive pulse P1 is the highest rank m in the process step S508, the control circuit 103 downgrades the main drive pulse P1 by a rank to a main drive pulse P1 (n-a) having a smaller energy by a predetermined amount. Then, the procedure goes back to the process step S502, and the main drive pulse P1 (n-a) is used for the next driving (Step S509). In this case, since the rotation is not possible even with the drive pulse P1*m*, which is the drive pulse having a maximum energy in the main drive pulse P1, waste of energy caused by driving with the main drive pulse P1*m* having the maximum energy for the next driving is avoided. At this time, the main drive pulse may be changed to the main drive pulse P10 having the minimum energy in order to achieve a high power-saving effect.

If the control circuit 103 determines that the induced signal VRs exceeding the reference threshold voltage Vcomp is detected within the third segment T3 in the process step S506 (It is a case of the pattern (x, 0, 1)) and when the rank n of the main drive pulse P1 is not the highest rank m, the main drive pulse P1 is upgraded by a rank to a main drive pulse P1 (n+1). Then, the procedure goes back to the process step S502, and the main drive pulse P1 is used for the next driving (Steps S511, S510; which is the large-load-increased driving, that is, the rotation with least energy) in FIG. 3 and FIG. 4. In this manner, the upgrade is performed in an early stage to prevent the stepping motor from becoming non-rotatable state.

If the rank n of the main drive pulse P1 is the highest rank m in the process step S511, the control circuit 103 cannot change the rank, and hence the main drive pulse P1 is not changed. Then the procedure goes back to the process step S502, and this main drive pulse P1 is used for the next driving (Step S513).

If the control circuit 103 determines that the induced signal VRs exceeding the reference threshold voltage Vcomp is detected within the detection area in the first segment T1 in the process step S504 (It is a case of the pattern (1, x, x).), in the same manner, whether or not the induced signal VRs exceeding the reference threshold voltage Vcomp is detected within the detection range in the second segment T2 is determined (Step S512).

If the control circuit 103 determines that the induced signal VRs exceeding the reference threshold voltage Vcomp is not detected within the detection area in the second segment T2 in the process step S512 (It is a case of the pattern (1, 0, x), the procedure goes to the process step S506 to perform the above-described process.

If the control circuit 103 determines that the induced signal VRs exceeding the reference threshold voltage Vcomp is detected within the detection area in the second segment T2 in the process step S512 (It is a case of the pattern (1, 1, x)), the procedure goes to the process step S513.

In contrast, if the control circuit 103 determines that the induced signal VRs exceeding the reference threshold voltage Vcomp is detected within the detection area in the second segment T2 in the process step S505 (It is a case of the pattern (0, 1, x), which is a case of the normal driving or the high-energy driving, and is the rotation with reserve in FIG. 3 and FIG. 4), and if the rank n of the main drive pulse P1 is the lowest rank 0 (Step S514 in FIG. 5), the rank cannot be downgraded and hence the procedure goes back to the process step S502 without changing the rank (Step S518 in FIG. 7).

If the control circuit 103 determines that the rank n of the main drive pulse P1 is not the lowest rank 0 in the process step S514, the number of times N is incremented by one (Step S515). If the control circuit 103 determines that the number of times N after the increment reaches a predetermined number of times (80 times in this embodiment) (Step S516), the main drive pulse P1 is degraded by a rank, the number of times N is set to zero, and the procedure goes back to the process step S502 (Step S517). If the control circuit 103 determines that the number of times N does not reach the predetermined number of times (80 in this embodiment), the main drive pulse P1 is not changed and the procedure goes back to the process step S502 (Step S518). Accordingly, since the downgrade is performed when the driving state with the main drive pulse having reserve energy occurs continuously by a predetermined number of times, the downgrade is performed under a stable driving state. Therefore, the stepping motor is prevented from becoming non-rotatable state due to the shortage of the energy after the downgrade and power saving is achieved.

It is needless to say that the stepping motor is prevented from becoming the non-rotatable state due to the shortage of the energy after the downgrade and the effect of the power saving is achieved even when starting with a given pulse width which is set considering the driving state according to the load increment.

Figure 6:
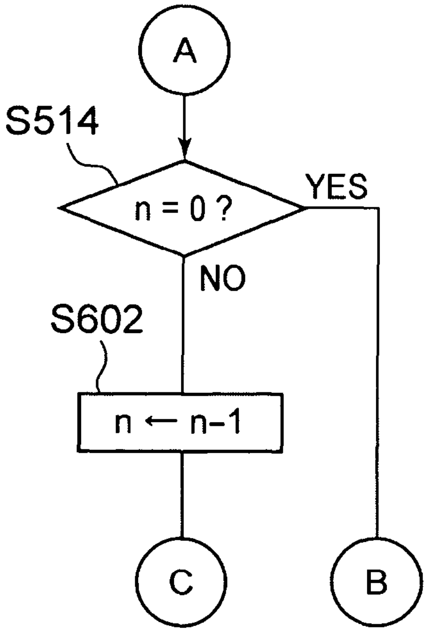
FIG. 6 is a flowchart showing the action of the stepping motor control circuit and the analogue electronic watch according to another embodiment of the invention.

FIG. 6 shows a flowchart showing an action of another embodiment of the invention in conjunction with FIG. 7. The flowchart in FIG. 6 shows a process specific to this another embodiment.

A different point of this another embodiment from the above-described embodiment is a process shown in FIG. 6, and the configuration such as the block diagram is the same. Referring now to FIG. 1 to FIG. 4, FIG. 6, and FIG. 7, the different points will be described.

If the control circuit 103 determines that the induced signal VRs exceeding the reference threshold voltage Vcomp is detected within the detection area in the second segment T2 in the process step S505 in FIG. 7 and when the rank n of the main drive pulse P1 is the lowest rank 0 (Step S514 in FIG. 5), the rank cannot be downgraded and hence the procedure goes back to the process step S502 without changing the rank (Step S518 in FIG. 7).

If the control circuit 103 determines that the rank n of the main drive pulse P1 is not the lowest rank 0 in the process step S514, the rank of the main drive pulse P1 is degraded by a rank immediately, and the procedure goes to the process step S502 (Step S602). Accordingly, since the downgrade is performed when the driving state with the main drive pulse having reserve of energy occurs once, a significant power saving is achieved.

As described thus far, the stepping motor control circuit according to the respective embodiments described above includes the rotation detection circuit 110 configured to detect the induced signal VRs generated by the rotation of the rotor 202 of the stepping motor 105 and detect whether or not the induced signal VRs exceeds the predetermined reference threshold voltage Vcomp in the detection segment T having a plurality of the detection areas, and the control unit configured to determine the state of rotation of the stepping motor 105 on the basis of the pattern indicating whether or not the induced signals VRs detected by the rotation detection circuit 110 in the plurality of detection areas exceed the reference threshold voltage Vcomp and, on the basis of the result of detection, drives the stepping motor 105 with any one of the plurality of main drive pulse P1 different from each other in energy or the correction drive pulse P2 having larger energy than the main drive pulse P1, wherein the ineffective area Ts is provided between at least the two detection areas, and the control unit determines the state of rotation of the stepping motor 105 without considering the induced signal VRs generated in the ineffective area Ts.

Therefore, even when the timing of occurrence of the induced signal VRs varies depending on the magnitude of energy of the main drive pulse P1, the state of rotation including the reserved drive capacity is determined further accurately and hence an adequate pulse control is achieved. Consequently, further stable rotation and reduction of power consumption are achieved.

In addition, the pulse control of the plurality of main drive pulses being different in energy is achieved adequately without the possibility of erroneous determination with a simple configuration.

Furthermore, even when the stepping motor is driven with the main drive pulse P1 having an excess of energy in comparison with the load in a case where an energy-variable range of the main drive pulse P1 is set to a wide range, the state of rotation can be determined accurately.

With the provision of the ineffective area Ts in the rear area of the first segment T1, even when the induced signal VRs is generated in an early stage in the case where the energy of the main drive pulse P1 is large, the induced signal VRs falls within the ineffective area Ts. Therefore, accurate determination of the state of rotation and the normal downgrade are achieved.

With the provision of the ineffective area Ts across the rear area of the first segment T1 and the front area of the second segment T2, the same effect as described above is achieved. In addition, even when the induced signal VRs is generated in retard when the energy of the main drive pulse P1 is small, the induced signal VRs falls within the ineffective area Ts. Therefore, accurate determination of the state of rotation and the normal upgrade are achieved.

According to the configurations in the respective embodiments described above, the state of rotation is determined without considering the induced signal VRs generated in the ineffective area Ts. Therefore, the rotation detection circuit 110 does not necessarily have to detect the induced signal VRs in the ineffective area Ts. Therefore, the rotation detection circuit 110 may be configured to maintain the driving state of the stepping motor 105 in a detection loop (described later) or maintain the driving state of the stepping motor 105 in a closed loop (described later). The configuration of the rotation detection circuit 110 may also be modified to perform an action to repeat the detection loop and the closed loop alternately at predetermined regular intervals in the ineffective area Ts, but not to detect the induced signal VRs, or not to use the induced signal VRs detected in the ineffective area Ts for determination of the state of rotation.

The detection loop and the closed loop will be described briefly, although detailed description will be given later. The detection loop means a state in which a loop is configured by inserting a detection element for detecting the induced signal VRs in series with the coil 209 of the stepping motor 105, and the closed loop means a state in which a loop is configured by short-circuiting the coil 209 of the stepping motor 105.

In still another embodiment of the invention, rotation detection circuit 110 is configured to maintain the driving state of the stepping motor 105 in the closed loop in the ineffective area Ts, whereby the accuracy of the detection of rotation is improved.

Subsequently, a further embodiment of the invention will be described. The configuration and action of the further embodiment of the invention are the same as those shown in FIG. 1, FIG. 2, and FIG. 4 to FIG. 7 in the respective embodiments shown above, and only the different points will be described below.

Figure 8:
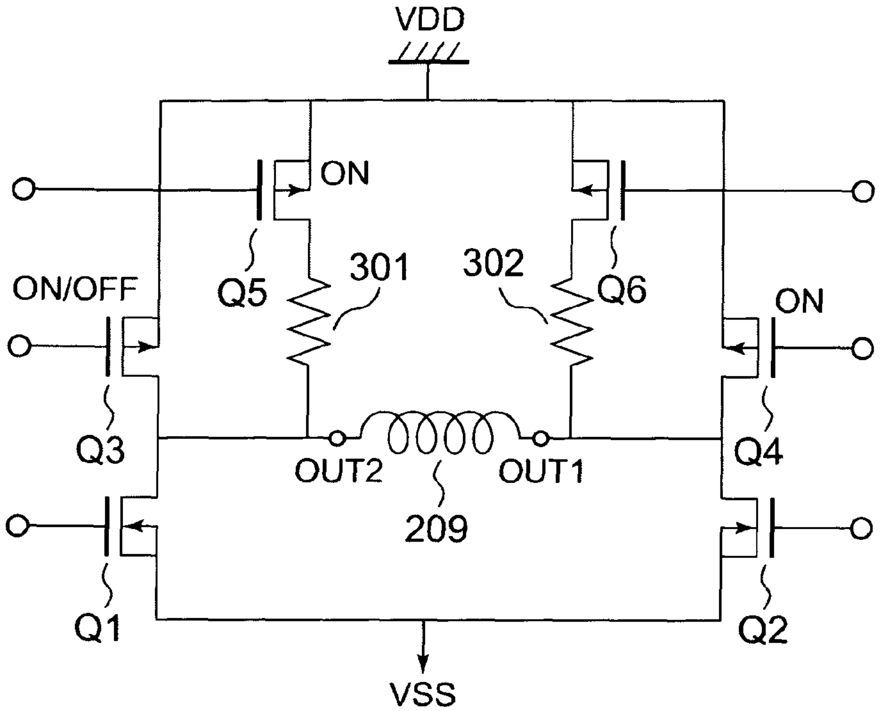
FIG. 8 is a partly detailed circuit diagram of a drive pulse selection circuit and a rotation detection circuit used in the respective embodiments of the invention.
Figure 9:
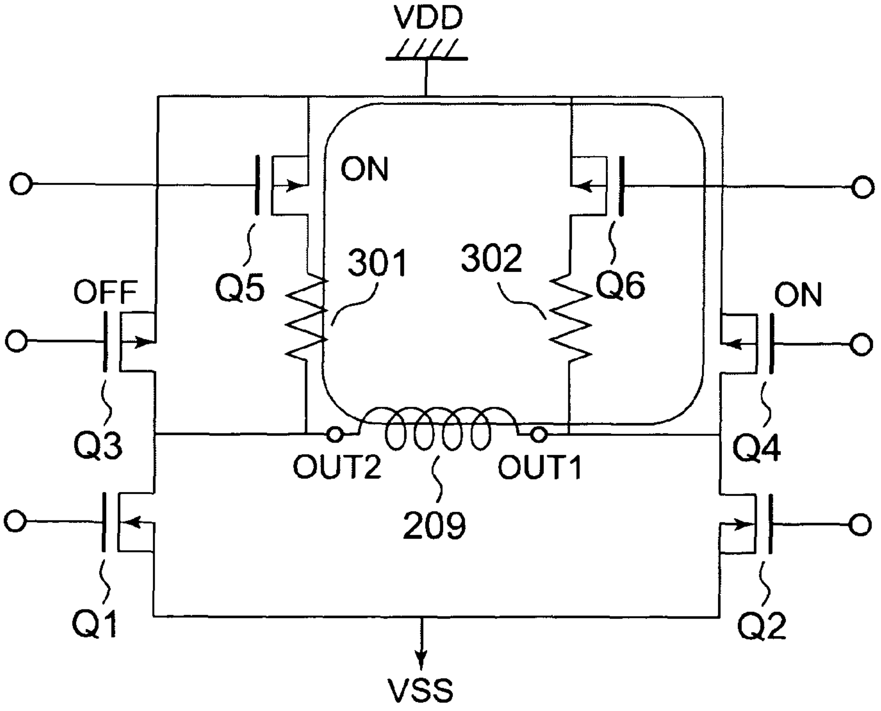
FIG. 9 is a partly detailed circuit diagram of the drive pulse selection circuit and the rotation detection circuit used in the respective embodiments of the invention.

FIG. 8 is a circuit diagram showing part of the drive pulse selection circuit 104 and the rotation detection circuit 110 in detail, and having a known configuration. FIG. 9 and FIG. 10 are explanatory drawings showing rotation detecting actions for detecting whether or not the stepping motor 105 is rotated.

FIG. 9 is a drawing showing the state in which the detection loop is configured, which corresponds to a state in which a detection element for detecting the induced signal VRs (detection elements 301 or 302) are connected in series with the coil 209 of the stepping motor 105 to form a loop.

FIG. 10 is a drawing showing the state in which the closed loop is configured, which corresponds to a state in which the coil 209 of the stepping motor 105 is short-circuited to form a loop.

In FIG. 8, P channel MOS transistors Q1 and Q2 and N channel MOS transistors Q3 and Q4 are components of the drive pulse selection circuit 104. The coil 209 of the stepping motor 105 is connected between a source connecting point between the transistor Q1 and the transistor Q3, and a source connecting point between the transistor Q2 and the transistor Q4.

In contrast, N channel MOS transistor Q3 to Q6, the detection resistance 301 connected in series with the transistor Q5, and the detection resistance 302 connected in series with the transistor Q6 are components of the rotation detection circuit 110.

The gates of the respective transistors Q1 to Q6 are turned ON and OFF by the control circuit 103. The second terminal OUT2 between the detection resistance 301 and the coil 209 and the first terminal OUT1 between the detection resistance 302 and the coil 209 are connected to input units of a comparator (not shown) in the rotation detection circuit 110. The predetermined reference threshold voltage Vcomp is supplied to a reference input unit of the comparator, and whether or not the induced signal VRs detected by the comparator exceeds the predetermined reference threshold voltage Vcomp is determined.

The transistor Q3 constitutes a first switch element, the transistor Q1 constitutes a second switch element, the transistor Q4 constitutes a third switch element, the transistor Q2 constitutes a fourth switch element, the transistor Q5 constitutes a fifth switch element, the transistor Q6 constitutes a sixth switch element, the detection resistance 301 constitutes the first detection element, and the detection resistance 302 constitutes the second detection element. The transistor Q5 and the detection resistance 301 constitute a first series circuit, and the transistor Q6 and the detection resistance 302 constitute a second series circuit.

In the case of rotating the stepping motor 105 in the rotating period in which the stepping motor 105 is rotated, a current is supplied to the coil 209 in the normal direction or in the reverse direction by turning the transistors Q2 and Q3 ON simultaneously or turning the transistors Q1 and Q4 ON simultaneously in response to the rotating control pulse from the control circuit 103, thereby rotating the stepping motor 105.

In a case of detecting the induced signal VRs generated in the stepping motor 105 by the rotation in the detection segment T following the rotating period, a detection signal generated in the detection resistance 301 by switching the transistor Q3 between ON and OFF at predetermined regular intervals in a state in which the transistors Q4 and Q5 are held in the ON state in response to the control pulse for detecting the rotation supplied from the control circuit 103 (the signal corresponding to the induced signal VRs generated by the rotation of the stepping motor 105) is retrieved and compared with the reference threshold voltage Vcomp, or a detection signal generated in the detection resistance 302 by switching the transistor Q4 between ON and OFF at predetermined regular intervals in a state in which the transistors Q3 and Q6 are held in the ON state (the signal corresponding to the induced signal VRs generated by the rotation of the stepping motor 105) is retrieved and compared with the reference threshold voltage Vcomp. Accordingly, the rotation detection circuit 110 detects whether or not the induced signal VRs exceeding the reference threshold voltage Vcomp is generated in the detection segment T.

In other words, in the case of detecting the induced signal VRs in the detection segment T, a state in which the transistor Q3 is turned OFF in the state in which the transistors Q4 and Q5 are held in the ON state in response to the control pulse for detecting the rotation supplied from the control circuit 103 (the detection loop in FIG. 9) and a state in which the transistor Q3 is turned ON in a state in which the transistors Q4 and Q5 are held in the ON state (the closed loop in FIG. 10) are repeated alternately at predetermined regular intervals.

At this time, in the state of the detection loop in FIG. 9, the loop is formed by the transistors Q4 and Q5, the detection resistances 301 and 302, and the coil 209. Therefore, the stepping motor 105 is not damped.

However, in the state of the closed loop in FIG. 10, the loop is formed by the transistors Q3 and Q4, and the coil 209, and the coil 209 is short-circuited. Therefore, the stepping motor 105 is damped, and the free rotary motion of the stepping motor 105 is restrained by the influence of the damping.

In this further embodiment, the level of the induced signal VRs at the time of the rotation with least energy is lowered by forming the closed loop in the ineffective area Ts. Therefore, by restraining the induced signal VRs in the segment T3 at the time of the rotation with least energy, erroneous detection such that the induced signal VRs generated in the segment T3 is erroneously detected in the segment T2 and hence is determined as the rotation with reserve even though there is no reserve in rotation is prevented.

FIG. 11 is a timing chart showing a case where the stepping motor 105 is driven with the main drive pulse P1, which corresponds to FIG. 3.

In FIG. 11, since the driving state of the stepping motor 105 is the closed loop in the ineffective area Ts as described above, the stepping motor 105 is damped and hence the induced signal VRs is not generated. Other actions are the same as the actions described in conjunction with FIG. 3.

In this manner, since the stepping motor 105 is damped by forming the rotation detection circuit 110 into the closed loop during the ineffective area Ts, generation of the induced signal VRs can be restrained or delayed.

Therefore, in a case where the energy rank of the main drive pulse P1 is set to vary in a wide range from a drive pulse having a small driving energy to a drive pulse having a large driving energy, there is a case where the driving energy of the main drive pulse P1 is small and hence the induced signal VRs supposed to be generated in the segment T3 is generated early and hence is included in the segment T2. However, by damping within the ineffective area Ts, the induced signal VRs can be prevented from being detected in the segment T2 by restraining the level of the induced signal VRs to a level of the reference threshold voltage Vcomp or lower, or by restraining the induced signal VRs from generating ahead of time, so that erroneous detection can be prevented.

In a case where the driving energy of the main drive pulse P1 is small, the induced signal VRs is supposed to be generated in the segment T1 and hence is upgraded. However, in a case where the time of day of generation of the induced signal VRs is delayed and hence is included in the segment T2, it is erroneously determined to be “downgrade” or “maintenance” instead of “upgrade”. However, according to this further embodiment, such an event can be prevented. In other words, even when such event that the time of day of generation of the induced signal VRs is delayed due to any reason is occurred, the induced signal VRs is included in the ineffective area Ts and hence is not detected so that normal upgrade is achieved.

In a case where the energy of the main drive pulse P1 is large, it is possible to prevent such event that the induced signal VRs appears at an early timing and hence is included in the segment T1 so that it is erroneously determined to be “maintenance” even when the induced signal VRs after the blocking of the main drive pulse P1 is supposed to be generated in the segment T2 and hence it should be determined to be “downgrade”.

In this manner, according to this further embodiment, the rotation detection circuit 110 is configured to detect the induced signal VRs by repeating the detection loop that detects the induced signal VRs generated by the stepping motor 105 with the detection elements 301 and 302 and the closed loop that damps the stepping motor 105 by short-circuiting the stepping motor 105 at predetermined regular intervals, wherein the closed loop is formed in the ineffective area Ts to damp the stepping motor 105. Therefore, even in the case of driving the stepping motor with a plurality of drive pulses being different in driving energy, the accurate pulse control can be performed without erroneous determination of the state of rotation in a simple structure.

According to the analogue electronic watch in the embodiment of the invention, since the analogue electronic watch includes the stepping motor 105 configured to rotate the time-of-day hands 107 to 109 and a stepping motor control circuit configured to control the stepping motor 105 and is characterized in that the stepping motor control circuits according to any one of the embodiments described above is employed as the stepping motor control circuit. Therefore, a further accurate movement of the time-of-day hands is achieved by performing an adequate pulse control on the basis of further accurate determination of the state of rotation of the stepping motor 105, and reduction of the power consumption is achieved.

Although the detection segment T is configured to have the three segments T1 to T3 in the respective embodiments, it may also be configured to have at least the two segments.

In the respective embodiments described above, the energy of the respective main drive pulses P1 is changed by differentiating the pulse width. However, the driving energy can be changed also by changing the number of comb-teeth pulses, or by changing the pulse voltage.

Also, although the analogue electronic watch has been described as the example of the application of the stepping motor, it may be applicable to electronic instruments which use the motor.

The stepping motor control circuit according to the invention may be applicable to various electronic instruments using the stepping motor.

The analogue electronic watch according to the invention is applicable to various analogue electronic watches such as analogue electronic wrist watches, or analogue electronic standing clocks.

What is claimed is:

1. A stepping motor control circuit comprising:

a rotation detection unit configured to detect an induced signal generated by the rotation of a rotor of a stepping motor and detect whether or not the induced signal exceeds a predetermined reference threshold voltage in a detection segment having a plurality of detection areas; and a control unit configured to determine the state of rotation of the stepping motor on the basis of the pattern indicating whether or not the induced signals detected by the rotation detection unit in the plurality of detection areas exceed the reference threshold voltage and, on the basis of the result of detection, and control the driving of the stepping motor with any one of a plurality of main drive pulses different from each other in energy or a correction drive pulse having larger energy than the main drive pulse, wherein an ineffective area is provided between at least the two detection areas, and the control unit determines the state of rotation of the stepping motor without considering the induced signal generated in the ineffective area.

2. A stepping motor control circuit according to claim 1, wherein the detection segment includes the detection area and is divided into a plurality of continuous segments, and at least one of the segments includes the detection area and the ineffective area.

3. A stepping motor control circuit according to claim 2, wherein the ineffective area is provided at least in a rear area of a first segment provided immediately after the driving of the main drive pulse.

4. A stepping motor control circuit according to claim 2, wherein the detection segment is divided at least into the first segment immediately after the driving with the main drive pulse and a second segment after the first segment, and the ineffective area is provided so as to extend across the first segment and the second segment.

5. A stepping motor control circuit according to claim 3, wherein the detection segment is divided at least into the first segment immediately after the driving with the main drive pulse and a second segment after the first segment, and the ineffective area is provided so as to extend across the first segment and the second segment.

6. A stepping motor control circuit according to claim 2, wherein the detection segment is divided at least into the first segment immediately after the driving with the main drive pulse, the second segment after the first segment, and a third segment after the second segment, wherein the ineffective area is provided so as to extend across the first segment and the second segment.

7. A stepping motor control circuit according to claim 3, wherein the detection segment is divided at least into the first segment immediately after the driving with the main drive pulse, the second segment after the first segment, and a third segment after the second segment, wherein the ineffective area is provided so as to extend across the first segment and the second segment.

8. A stepping motor control circuit according to claim 4, wherein the detection segment is divided at least into the first segment immediately after the driving with the main drive pulse, the second segment after the first segment, and a third segment after the second segment, wherein the ineffective area is provided so as to extend across the first segment and the second segment.

9. A stepping motor control circuit according to claim 5, wherein the detection segment is divided at least into the first segment immediately after the driving with the main drive pulse, the second segment after the first segment, and a third segment after the second segment, wherein the ineffective area is provided so as to extend across the first segment and the second segment.

10. A stepping motor control circuit according to claim 6, wherein in the state of the normal driving, the first segment corresponds to a segment in which the first state of rotation in the normal direction of the rotor is determined in the third quadrant of a space around the rotor, the second segment corresponds to a segment in which the first state of rotation in the normal direction and the first state of rotation in the reverse direction of the rotor is determined in the third quadrant, and the third segment corresponds to a segment in which the state of rotation after the first rotation in the reverse direction of the rotor is determined in the third quadrant.

11. A stepping motor control circuit according to claim 7, wherein in the state of the normal driving, the first segment corresponds to a segment in which the first state of rotation in the normal direction of the rotor is determined in the third quadrant of a space around the rotor, the second segment corresponds to a segment in which the first state of rotation in the normal direction and the first state of rotation in the reverse direction of the rotor is determined in the third quadrant, and the third segment corresponds to a segment in which the state of rotation after the first rotation in the reverse direction of the rotor is determined in the third quadrant.

12. A stepping motor control circuit according to claim 8, wherein in the state of the normal driving, the first segment corresponds to a segment in which the first state of rotation in the normal direction of the rotor is determined in the third quadrant of a space around the rotor, the second segment corresponds to a segment in which the first state of rotation in the normal direction and the first state of rotation in the reverse direction of the rotor is determined in the third quadrant, and the third segment corresponds to a segment in which the state of rotation after the first rotation in the reverse direction of the rotor is determined in the third quadrant.

13. A stepping motor control circuit according to claim 9, wherein in the state of the normal driving, the first segment corresponds to a segment in which the first state of rotation in the normal direction of the rotor is determined in the third quadrant of a space around the rotor, the second segment corresponds to a segment in which the first state of rotation in the normal direction and the first state of rotation in the reverse direction of the rotor is determined in the third quadrant, and the third segment corresponds to a segment in which the state of rotation after the first rotation in the reverse direction of the rotor is determined in the third quadrant.

14. A stepping motor control circuit according to claim 1, wherein the rotation detection unit is configured to detect the induced signal by repeating the detection loop that detects the induced signal generated by the stepping motor with detection elements, and a closed loop that damps the stepping motor by short-circuiting the stepping motor at predetermined regular intervals, wherein the closed loop is formed in the ineffective area to damp the stepping motor.

15. A stepping motor control circuit according to claim 2, wherein the rotation detection unit is configured to detect the induced signal by repeating the detection loop that detects the induced signal generated by the stepping motor with detection elements, and a closed loop that damps the stepping motor by short-circuiting the stepping motor at predetermined regular intervals, wherein the closed loop is formed in the ineffective area to damp the stepping motor.

16. A stepping motor control circuit according to claim 3, wherein the rotation detection unit is configured to detect the induced signal by repeating the detection loop that detects the induced signal generated by the stepping motor with detection elements, and a closed loop that damps the stepping motor by short-circuiting the stepping motor at predetermined regular intervals, wherein the closed loop is formed in the ineffective area to damp the stepping motor.

17. A stepping motor control circuit according to claim 4, wherein the rotation detection unit is configured to detect the induced signal by repeating the detection loop that detects the induced signal generated by the stepping motor with detection elements, and a closed loop that damps the stepping motor by short-circuiting the stepping motor at predetermined regular intervals, wherein the closed loop is formed in the ineffective area to damp the stepping motor.

18. A stepping motor control circuit according to claim 5, wherein the rotation detection unit is configured to detect the induced signal by repeating the detection loop that detects the induced signal generated by the stepping motor with detection elements, and a closed loop that damps the stepping motor by short-circuiting the stepping motor at predetermined regular intervals, wherein the closed loop is formed in the ineffective area to damp the stepping motor.

19. A stepping motor control circuit according to claim 6, wherein the rotation detection unit is configured to detect the induced signal by repeating the detection loop that detects the induced signal generated by the stepping motor with detection elements, and a closed loop that damps the stepping motor by short-circuiting the stepping motor at predetermined regular intervals, wherein the closed loop is formed in the ineffective area to damp the stepping motor.

20. An analogue electronic watch having a stepping motor configured to rotate time-of-day hands, and a stepping motor control circuit configured to control the stepping motor, wherein the stepping motor control circuit according to claim 1 is used as the stepping motor control circuit.

* * * * *